(12) United States Patent
Taniguchi et al.

(10) Patent No.: US 12,512,972 B2
(45) Date of Patent: Dec. 30, 2025

(54) QUANTUM KEY DISTRIBUTION SYSTEM, QUANTUM KEY DISTRIBUTION METHOD AND QUANTUM KEY DISTRIBUTION PROGRAM

(71) Applicant: NTT, Inc., Tokyo (JP)

(72) Inventors: Atsushi Taniguchi, Musashino (JP); Hirokazu Takahashi, Musashino (JP); Hideki Nishizawa, Musashino (JP)

(73) Assignee: NTT, Inc., Tokyo (JP)

( * ) Notice: Subject to any disclaimer, the term of this patent is extended or adjusted under 35 U.S.C. 154(b) by 68 days.

(21) Appl. No.: 18/688,429

(22) PCT Filed: Sep. 1, 2021

(86) PCT No.: PCT/JP2021/032144
§ 371 (c)(1),
(2) Date: Mar. 1, 2024

(87) PCT Pub. No.: WO2023/032082
PCT Pub. Date: Mar. 9, 2023

(65) Prior Publication Data
US 2024/0372713 A1    Nov. 7, 2024

(51) Int. Cl.
*H04L 9/08*     (2006.01)
*H04B 10/85*    (2013.01)

(52) U.S. Cl.
CPC .......... *H04L 9/0852* (2013.01); *H04B 10/85* (2013.01)

(58) Field of Classification Search
CPC .......... H04L 9/0852; H04L 9/08; H04L 9/12; H04B 10/85
See application file for complete search history.

(56) References Cited

U.S. PATENT DOCUMENTS

2008/0147820 A1* 6/2008 Maeda .............. H04L 63/06
                                              709/213
2017/0085409 A1* 3/2017 Ichikawa .............. H04L 7/042
(Continued)

OTHER PUBLICATIONS

Sasaki et al., "Field test of quantum key distribution in the Tokyo QKD Network," Optics Express, May 2011, 19(11):10387-10409.
(Continued)

*Primary Examiner* — Baotran N To
(74) *Attorney, Agent, or Firm* — Fish & Richardson P.C.

(57) ABSTRACT

A transmission device (1) includes a modulation unit (14) that modulates photons with a predetermined data pattern, a synchronization signal generation unit (12) that generates a frame synchronization signal of a random number data pattern, an identification signal generation unit (13) that divides the frame into a plurality of subframes and generate a subframe identification signal indicating a subframe, and a transmission unit (17) that transmits the photons modulated by the modulation unit (14), the frame synchronization signal, and the subframe identification signal. A reception device (2) includes a reception unit (30) that receives the photons, the frame synchronization signal, and the subframe identification signal transmitted from the transmission unit (17), a decoding unit (21) that detects and decodes a data pattern from the photons, a time measurement unit (26) that measures an elapsed time from the subframe identification signal until a photon is detected in each subframe, and a detection time calculation unit (27) that calculates a photon detection time from the frame synchronization signal to photon detection in one frame, based on the elapsed time.

7 Claims, 7 Drawing Sheets

(56) References Cited

U.S. PATENT DOCUMENTS

2019/0190706 A1* 6/2019 Stack .................. H04L 9/0858
2020/0244449 A1* 7/2020 Stack .................. H04L 9/0852
2021/0075602 A1* 3/2021 Stack .................. H04L 9/0852

OTHER PUBLICATIONS

Takesue et al., "Quantum key distribution over 40 dB channel loss using superconducting single photon detectors," Nature Photonics, Jun. 2007, 1:343-348, 15 pages.
The bh TCSPC Handbook, 8th ed., Becker (ed.), Sep. 2019, 968 pages.
Yuan et al., "10 Mb/s quantum key distribution," CoRR, submitted on Jul. 2018, arXiv:1807.04484, 7 pages.

* cited by examiner

QUANTUM KEY DISTRIBUTION SYSTEM, QUANTUM KEY DISTRIBUTION METHOD AND QUANTUM KEY DISTRIBUTION PROGRAM

CROSS-REFERENCE TO RELATED APPLICATIONS

This application is a National Stage application under 35 U.S.C. § 371 of International Application No. PCT/JP2021/032144, having an International Filing Date of Sep. 1, 2021. The disclosure of the prior application is considered part of the disclosure of this application, and is incorporated by reference in its entirety into this application.

TECHNICAL FIELD

The present invention relates to a quantum key distribution system, a quantum key distribution method, and a quantum key distribution program.

BACKGROUND ART

In order to realize highly confidential and secure communication, quantum key distribution (QKD) has been proposed in Non Patent Literature 1, 2, 3, and 4 in which both a transmission unit and a reception unit share a private key that is difficult for others to intercept.

In quantum key distribution, a transmission unit modulates single photons or weak coherent light at a single photon level with a random data pattern, and transmits the modulated data to a reception unit via a transmission line. The reception unit removes bits that may have been intercepted from the bits of the received random data pattern, and generates a key from the remaining bits, thereby sharing a secure key that has not been intercepted between the transmission unit and the reception unit. Since a key rate is proportional to a clock frequency, the key rate can be increased by increasing the clock frequency (see Non Patent Literature 1).

As a method for identifying the head of a random data pattern, a method using a frame synchronization signal is known. Since most bits transmitted from the transmission unit reach the reception unit in the case of existing communication methods, a synchronization signal can be extracted from the transmitted signal. On the other hand, in quantum key distribution, most photons disappear due to loss in the fiber during fiber propagation, and therefore a frame synchronization signal cannot be extracted. Therefore, a frame synchronization signal is transmitted at a wavelength (another wavelength) different from the above-described modulation signal (see Non Patent Literature 2).

As a method for measuring the time from a frame synchronization signal to photon detection, there is a time-correlated single photon counting method (TC-SPC) (see Non Patent Literature 4). In the TC-SPC, a ramp signal is generated from a generation time of a synchronization signal, an elapsed time is measured on the basis of a voltage value of the ramp signal, and a data pattern is recorded.

CITATION LIST

Non Patent Literature

Non Patent Literature 1: Takesue, Hiroki, et al. "Quantum key distribution over a 40-dB channel loss using superconducting single-photon detectors." Nature photonics 1.6 (2007):343-348.

Non Patent Literature 2: Sasaki, Masahide, et al. "Field test of quantum key distribution in the Tokyo QKD Network." Optics express 19.11 (2011):10387-10409.

Non Patent Literature 3: Yuan, Zhiliang, et al. "10-Mb/s quantum key distribution." Journal of Lightwave Technology 36.16 (2018):3427-3433.

Non Patent Literature 4: Wolfgang Becker "The bh TCSPC Handbook", Eighth Edition

SUMMARY OF INVENTION

Technical Problem

When the clock frequency is increased, inter-symbol interference due to device jitter becomes a main cause of error. In order to measure photons with small jitter, highly accurate time measurement is required. However, in a case where the above-described TC-SPC is employed, a long data length cannot be measured due to the voltage value (voltage increase width) of the ramp signal. In a case where the measurement time for counting photons is shorter than the data pattern length, photons outside the measurement time cannot be detected, resulting in a decrease in the key rate. On the other hand, in order to generate a secure key, it is necessary to set the data pattern to $10^6$ or more (see Non Patent Literature 3).

Furthermore, since there is also an error in the time accuracy of the device, there is a likelihood that the error will increase in bits away from the synchronization signal in the difference measurement.

The present invention has been made in view of the above circumstances, and an object of the present invention is to provide a quantum key distribution system, a quantum key distribution method, and a quantum key distribution program capable of reliably detecting a data pattern and generating a quantum key even in a case where a length of the data pattern is long.

Solution to Problem

According to one aspect of the present invention, there is provided a quantum key distribution system that distributes a quantum key between a transmission device and a reception device, in which the transmission device includes: a modulation unit configured to modulate photons output from a light source unit with a predetermined data pattern; a synchronization signal generation unit configured to generate a frame synchronization signal indicating a position of a frame of a random number data pattern; an identification signal generation unit configured to divide the frame into a plurality of subframes and generate a subframe identification signal indicating a subframe; and a transmission unit configured to transmit the photons modulated by the modulation unit, the frame synchronization signal, and the subframe identification signal, and the reception device includes: a reception unit configured to receive the photons, the frame synchronization signal, and the subframe identification signal transmitted from the transmission unit; a decoding unit configured to decode a data pattern from the photons received by the reception unit; a time measurement unit configured to measure an elapsed time from the subframe identification signal until a photon is detected in each subframe; and a detection time calculation unit configured to calculate a photon detection time from the frame synchronization signal to photon detection in one frame, based on the elapsed time.

According to one aspect of the present invention, there is provided a quantum key distribution method for distributing a quantum key between a transmission device and a reception device, the method including: at the transmission device, a step of modulating photons output from a light source unit with a predetermined data pattern; a step of generating a frame synchronization signal indicating a position of a frame of a random number data pattern; a step of dividing the frame into a plurality of subframes and generating a subframe identification signal indicating a subframe; and a step of transmitting the modulated photons, the frame synchronization signal, and the subframe identification signal, and at the reception device, a step of receiving the photons, the frame synchronization signal, and the subframe identification signal transmitted from the transmission device; a step of decoding a data pattern from the received photons; a step of measuring an elapsed time from the subframe identification signal until a photon is detected in each subframe; and a step of calculating a photon detection time from the frame synchronization signal to photon detection in one frame, based on the elapsed time.

According to one aspect of the present invention, there is provided a quantum key distribution program for causing a computer to function as the quantum key distribution system.

Advantageous Effects of Invention

According to the present invention, it is possible to reliably detect photons and generate a quantum key even in a case where a data pattern length is long.

BRIEF DESCRIPTION OF DRAWINGS

FIG. 2 is a timing chart illustrating each piece of data distributed from a transmission device to a reception device according to the first embodiment, in which FIG. 2(a) illustrates a frame synchronization signal, FIG. 2(b) illustrates a subframe identification signal, and FIG. 2(c) illustrates a photon generation timing.

FIG. 3 is a timing chart illustrating each piece of data distributed from the transmission device to the reception device in a case where a subframe is not used, in which FIG. 3(a) illustrates a frame synchronization signal and FIG. 3(b) illustrates a photon generation timing.

DESCRIPTION OF EMBODIMENTS

The present embodiment will be described below. First, an outline of quantum key distribution (QKD) employed in a quantum cryptographic communication device will be described.

In quantum key distribution, an error rate is estimated by exchanging sample bits after generating a raw key. On the basis of the estimated error rate, confidentiality enhancement is performed, and a bit with higher security is selected from the raw key. From the theory of confidentiality amplification, a length "r" of a secure key is expressed by the following Equation (1).

$$r = n - t - s \qquad (1)$$

In Equation (1), "n" is a data pattern length, "t" is the number of sample bits exchanged for error correction, and "s" is a security parameter indicating a likelihood of information leakage.

In quantum key distribution, it is required to minimize an error in error rate estimation, and obtain "n<<t" by reducing the number of sample bits "t". In order to secure a certain number of sample bits and to generate a secure key, it is necessary to set the bit string to $10^6$ or more. Therefore, it is required to increase the data pattern length.

In the present embodiment, one frame is divided into a plurality of subframes, and an elapsed time from a subframe identification signal indicating the start of a subframe to photon detection within a period of each subframe is measured. Furthermore, by combining the elapsed times in each subframe, the data pattern length can be increased, thereby improving the accuracy of error estimation. The embodiments will be described in detail below.

First Embodiment

Figure 1:
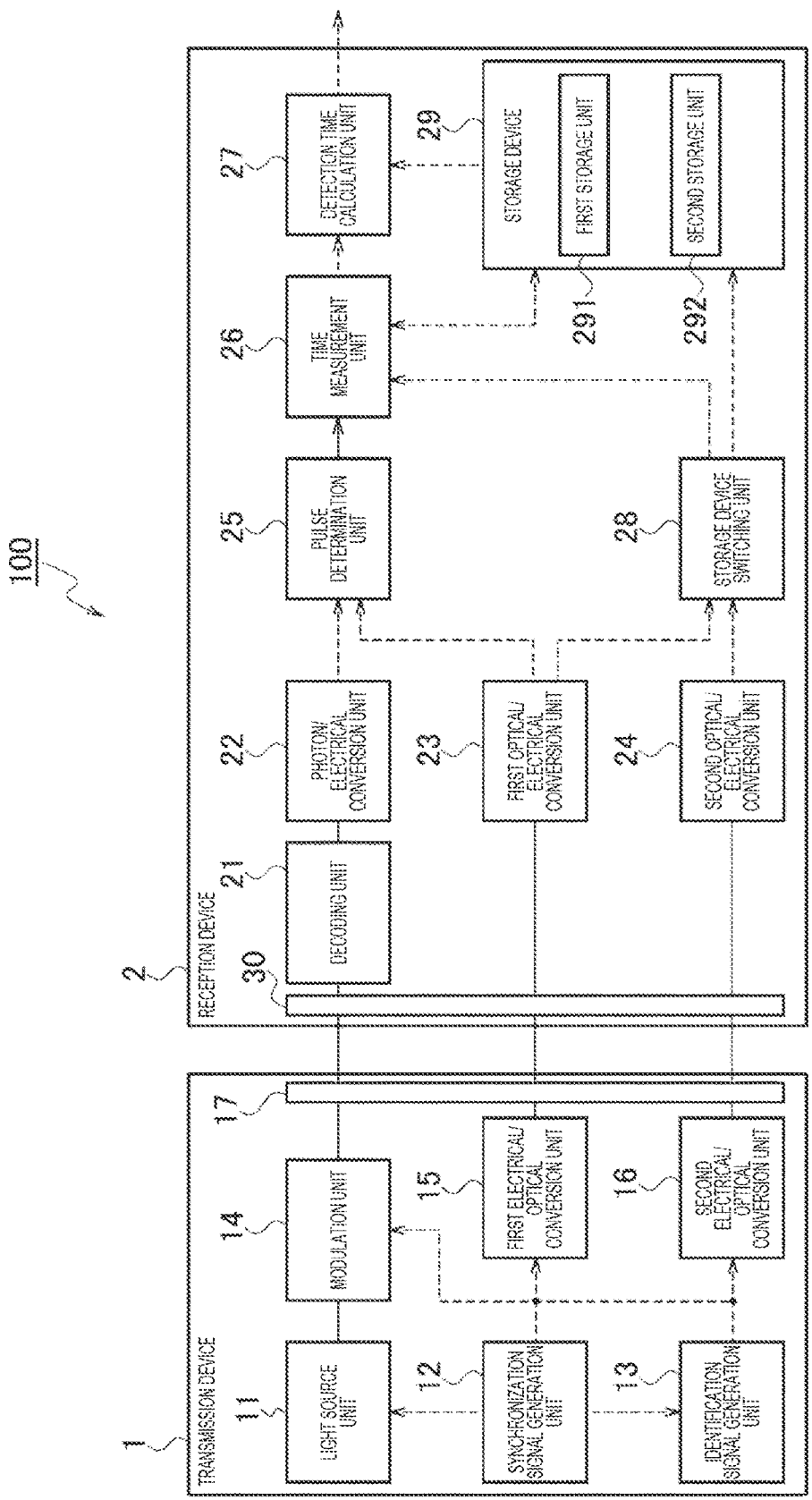
FIG. 1 is a block diagram illustrating a configuration of a quantum key distribution system according to a first embodiment.

FIG. 1 is a block diagram illustrating a configuration of a quantum key distribution system according to a first embodiment. As illustrated in FIG. 1, a quantum key distribution system 100 according to the first embodiment includes a transmission device 1 and a reception device 2. In FIG. 1, a solid line connecting the respective blocks indicates an optical signal, and a broken line indicates an electrical signal.

The transmission device 1 includes a light source unit 11, a synchronization signal generation unit 12, an identification signal generation unit 13, a modulation unit 14, a first electrical/optical conversion unit 15 (hereinafter abbreviated as a "conversion unit 15"), a second electrical/optical conversion unit 16 (hereinafter abbreviated as a "conversion unit 16"), and a transmission unit 17.

The light source unit 11 generates photons and outputs the generated photons to the modulation unit 14. Note that a photon sequence that is a sequence of a certain number of photons may be used instead of photons. In the present embodiment, "photons" and "photon sequences" will be collectively described as "photons". In addition, weak coherent light may be used.

The synchronization signal generation unit 12 generates a frame synchronization signal indicating the position of a frame for each predetermined frame. A "frame" is a data pattern of a fixed-length random number transmitted by the transmission device 1. The frame synchronization signal is a signal indicating a repetitive position of the data pattern, and may be a 1-bit signal only at the head of the data pattern and a 0-bit signal in the remainder, or may be a 1-bit signal in the middle and a 0-bit signal in the remainder. The synchronization signal generation unit 12 outputs the frame synchronization signal to the identification signal generation unit 13, the modulation unit 14, and the conversion unit 15.

Figure 2:
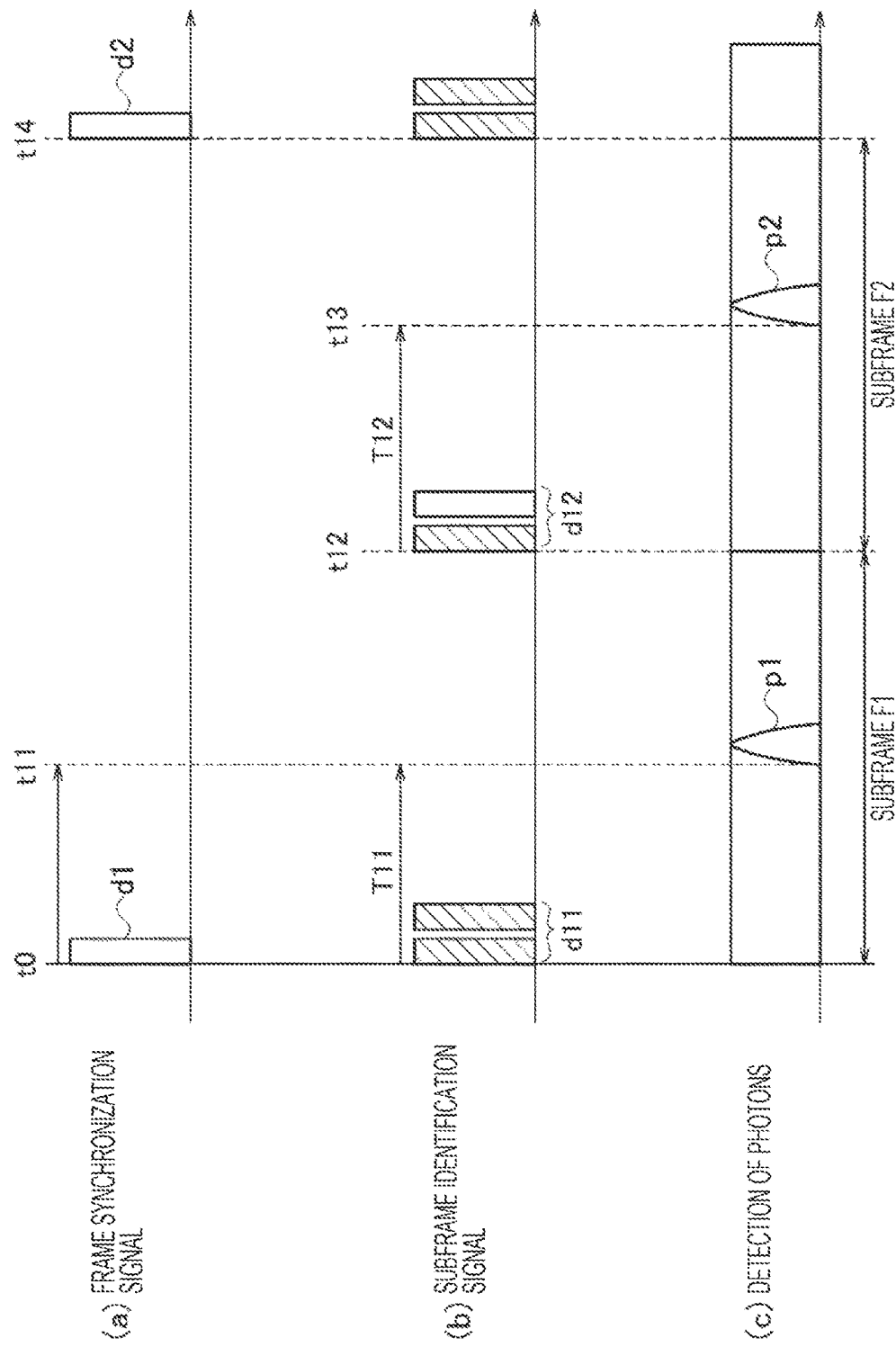

FIG. 2 is a timing chart illustrating each piece of data distributed from the transmission device 1 to the reception device 2. FIG. 2(a) illustrates a frame synchronization signal. The synchronization signal generation unit 12 outputs a frame synchronization signal for each frame. Specifically, a frame synchronization signal d1 is output at a time t0, and a frame synchronization signal d2 is output at a time t14. That is, a period from the time t0 to the time t14 illustrated in FIG. 2(a) is one frame.

The identification signal generation unit 13 divides the frame into a plurality of subframes and generates a subframe identification signal indicating a subframe. The subframe identification signal is a signal for identifying a subframe, and the head of the subframe may be a one bit, or information for identifying a subframe may be included in several bits at the head of the subframe. Such information may be included not at the head, but at the end of the subframe.

That is, the identification signal generation unit 13 divides one frame into a plurality of subframes and generates a subframe identification signal for identifying each subframe. FIG. 2(b) illustrates a subframe identification signal. FIG. 2(b) illustrates an example in which one frame is divided into two subframes F1 and F2. The identification signal generation unit 13 outputs subframe identification signals d11 and d12 indicating the start of the subframe to the heads of the subframes F1 and F2. In FIG. 2(b), a hatched pulse indicates a one bit, and an outlined pulse indicates a zero bit.

FIG. 2(c) illustrates photons received by the reception device 2. That is, regarding the photons transmitted from the transmission device 1, most of the photons and photon sequences disappear due to fiber loss during fiber propagation. Therefore, as illustrated in FIG. 2(c), only some photons are present, and the number of photons in one frame is also reduced.

In the example illustrated in FIG. 2(c), a photon p1 is included within the measurement time by the subframe F1, and a photon p2 is included within the measurement time by the subframe F2.

Figure 3:
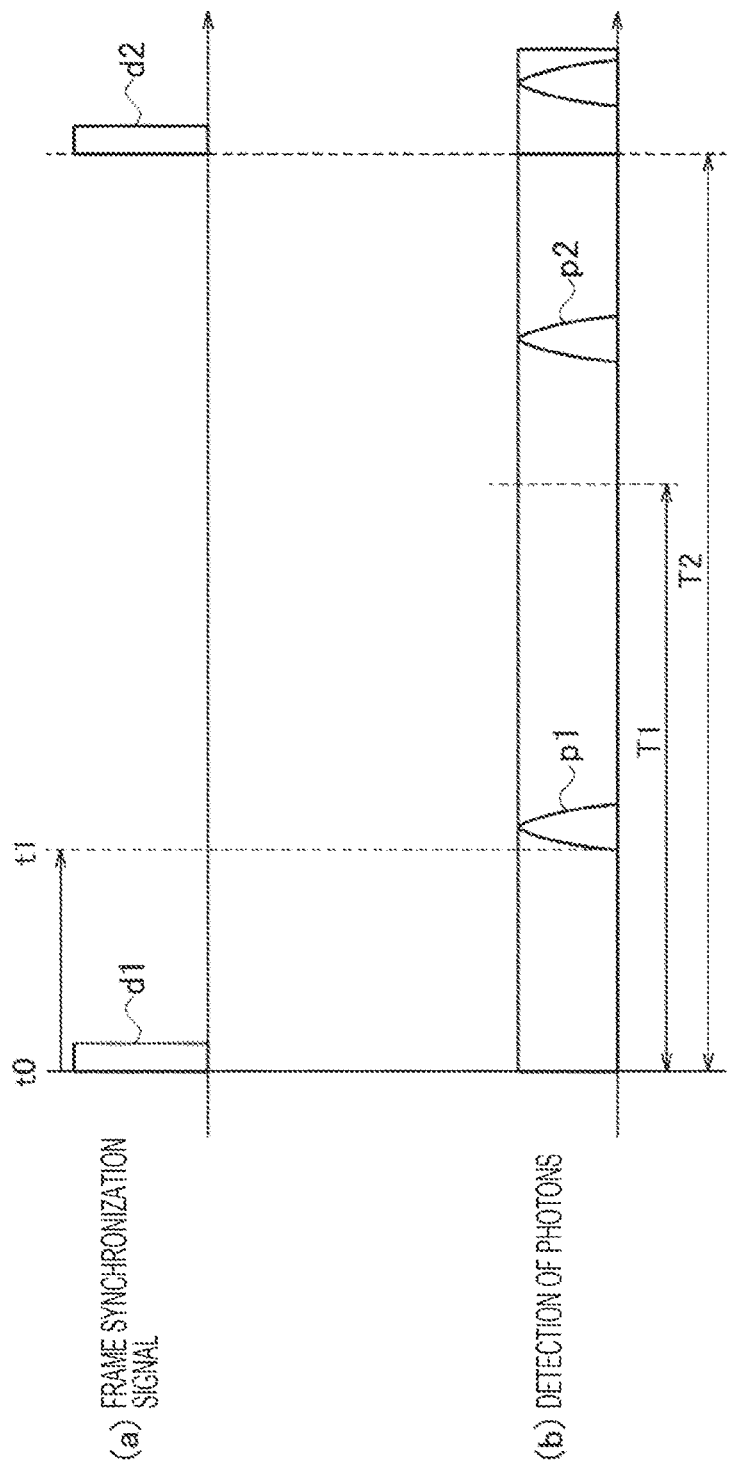

FIG. 3 is a timing chart illustrating each piece of data distributed from the transmission device 1 to the reception device 2 in a case where one frame is not divided into subframes. FIG. 3(a) illustrates a frame synchronization signal, and FIG. 3(b) illustrates photons received by the reception device 2. As illustrated in FIG. 3(b), photons p1 and p2 are received within a period T2 of one frame. The photon p1 is included within a measurement time T1 with reference to the frame synchronization signal d1. Therefore, the time from a generation time t0 of the frame synchronization signal d1 to a detection time t1 of the photon p1 can be measured. However, since the photon p2 is not included within the measurement time T1, the time until the photon p2 is generated cannot be measured.

By generating the subframe identification signal by the identification signal generation unit 13 and setting the measurement time with reference to the subframe identification signal, as illustrated in FIG. 2(c), each of the photons p1 and p2 can be included within the measurement time with reference to the subframe identification signals d11 and d12.

The modulation unit 14 illustrated in FIG. 1 modulates photons output from the light source unit 11 with a predetermined data pattern. That is, the modulation unit 14 modulates photons with a predetermined data pattern, in synchronization with the frame synchronization signal generated by the synchronization signal generation unit 12. The modulation unit 14 outputs the modulated photons to the transmission unit 17.

The conversion unit 15 converts the frame synchronization signal generated by the synchronization signal generation unit 12 into an optical signal and outputs the optical signal to the transmission unit 17. The conversion unit 16 converts the subframe identification signal generated by the identification signal generation unit 13 into an optical signal, and outputs the optical signal to transmission unit 17. The conversion unit 15 may set the frame synchronization signal to have the same wavelength as or a different wavelength from the wavelength at which the photons modulated by the modulation unit 14 are transmitted. Similarly, the conversion unit 16 may convert the subframe identification signal into an optical signal having the same wavelength as the wavelength at which the photons modulated by the modulation unit 14 are transmitted, the same wavelength as that of the conversion unit 15, or a wavelength different from those of the modulation unit 14 and the conversion unit 15.

In the case of the same wavelength, signals may be transmitted on different fibers, or signals may be transmitted on different cores of a multi-core fiber. Signals may be transmitted by multiplexing with orthogonal polarizations. Alternatively, the same signal may be superimposed and transmitted as in a second embodiment and a third embodiment, which will be described later. In the case of another wavelength, signals may be transmitted by wavelength multiplexing. In that case, since the dispersion varies depending on the wavelength, it is also possible to apply dispersion compensation.

The transmission unit 17 transmits the photons modulated by the modulation unit 14, the frame synchronization signal, and the subframe identification signal to the reception device 2. The transmission unit 17 transmits the frame synchronization signal and the subframe identification signal to the reception device 2 as an optical signal having a wavelength different from that of the photon.

The reception device 2 includes a reception unit 30, a decoding unit 21, a photon/electrical conversion unit 22 (hereinafter abbreviated as a "conversion unit 22"), a first optical/electrical conversion unit 23 (hereinafter abbreviated as a "conversion unit 23"), a second optical/electrical conversion unit 24 (hereinafter abbreviated as a "conversion unit 24"), a pulse determination unit 25, a time measurement unit 26, a detection time calculation unit 27, a storage device switching unit 28, and a storage device 29.

The reception unit 30 receives the photons, the frame synchronization signal, and the subframe identification signal transmitted from the transmission unit 17.

The decoding unit 21 decodes the data pattern from the photons transmitted from the transmission unit 17. That is, the decoding unit 21 acquires photons modulated by the modulation unit 14 and transmitted from the transmission unit 17, and decodes data included in the photons. As a data modulation/decoding method, space, polarization, phase, time, and the like can be applied.

The conversion unit 22 converts the photons decoded by the decoding unit 21 into electrical signals. The conversion unit 22 outputs the converted electrical signals to the pulse determination unit 25.

The conversion unit 23 converts the frame synchronization signal transmitted from the transmission unit 17 into an electrical signal. The conversion unit 23 outputs the converted electrical signal to the pulse determination unit 25 and the storage device switching unit 28.

The conversion unit 24 converts the subframe identification signal transmitted from transmission unit 17 into an electrical signal. The conversion unit 23 outputs the converted electrical signal to the storage device switching unit 28.

The pulse determination unit 25 detects the rise time of the pulse of the frame synchronization signal. Specifically, the pulse determination unit 25 detects the generation times of the frame synchronization signals d1 and d2 illustrated in FIG. 2(a). The pulse determination unit 25 outputs the generation time of the frame synchronization signal to the time measurement unit 26.

The time measurement unit 26 measures the elapsed time from the subframe identification signal until the photon is detected in each subframe. The time measurement unit 26 measures the elapsed time from when the frame synchronization signal transmitted from the transmission unit 17 is detected to when the photon is detected on the basis of the ramp signal.

That is, when the pulse determination unit 25 detects a frame synchronization signal, the time measurement unit 26 generates a ramp signal from the detection time. When photons are detected, the time measurement unit 26 stops increasing the ramp signal. The time measurement unit 26 measures a voltage value when stopping increasing the ramp signal, and calculates an elapsed time from the subframe identification signal until the photon is detected on the basis of the voltage value. Specifically, as illustrated in FIG. 2(c), for the subframe F1, an elapsed time T11 from when the subframe identification signal d11 is detected to when the photon p1 is detected within the detection period is calculated. For the subframe F2, an elapsed time T12 from when the subframe identification signal d12 is detected to when the photon p2 is detected within the detection period is calculated.

The quantum key distribution system 100 according to the present embodiment may include a storage device 29. The storage device 29 stores the elapsed time measured by the time measurement unit 26. The storage device 29 includes a first storage unit 291 and a second storage unit 292. The first storage unit 291 and the second storage unit 292 store a time from when the subframe identification signal is detected to when photons are detected within a certain detection period. Specifically, the elapsed times T11 and T12 illustrated in FIG. 2(c) are stored in the first and second storage units 291 and 292, respectively.

The storage device switching unit 28 switches the first storage unit 291 and the second storage unit 292 provided in the storage device 29 on the basis of the subframe identification signal transmitted from the transmission unit 17, and selects a storage unit serving as a storage destination.

When receiving the subframe identification signal of the subframe F1, the storage device switching unit 28 selects the first storage unit 291. Therefore, the elapsed time in the subframe F1 measured by the time measurement unit 26 is stored in the first storage unit 291. When receiving the subframe identification signal of the subframe F2, the storage device switching unit 28 selects the second storage unit 292. Therefore, the elapsed time in the subframe F2 measured by the time measurement unit 26 is stored in the second storage unit 292.

The detection time calculation unit 27 calculates a photon detection time from the frame synchronization signal to photon detection in one frame on the basis of the elapsed time. The detection time calculation unit 27 reads the elapsed time stored in the storage device 29 and calculates the photon detection time. That is, the detection time calculation unit 27 combines the elapsed times until photon detection detected within the measurement period in each of the subframes F1 and F2 to calculate the time from the generation time of the frame synchronization signal to the detection of photon data (photon detection time). The detection time calculation unit 27 outputs data of the calculated photon detection time to an arithmetic device (not illustrated) provided in the stage following the detection time calculation unit 27. The arithmetic device generates a raw key on the basis of the data of the photon detection time and base information set in advance. The generated raw key is shared between the transmission device 1 and the reception device 2, and used for quantum cryptographic communication.

Figure 4:
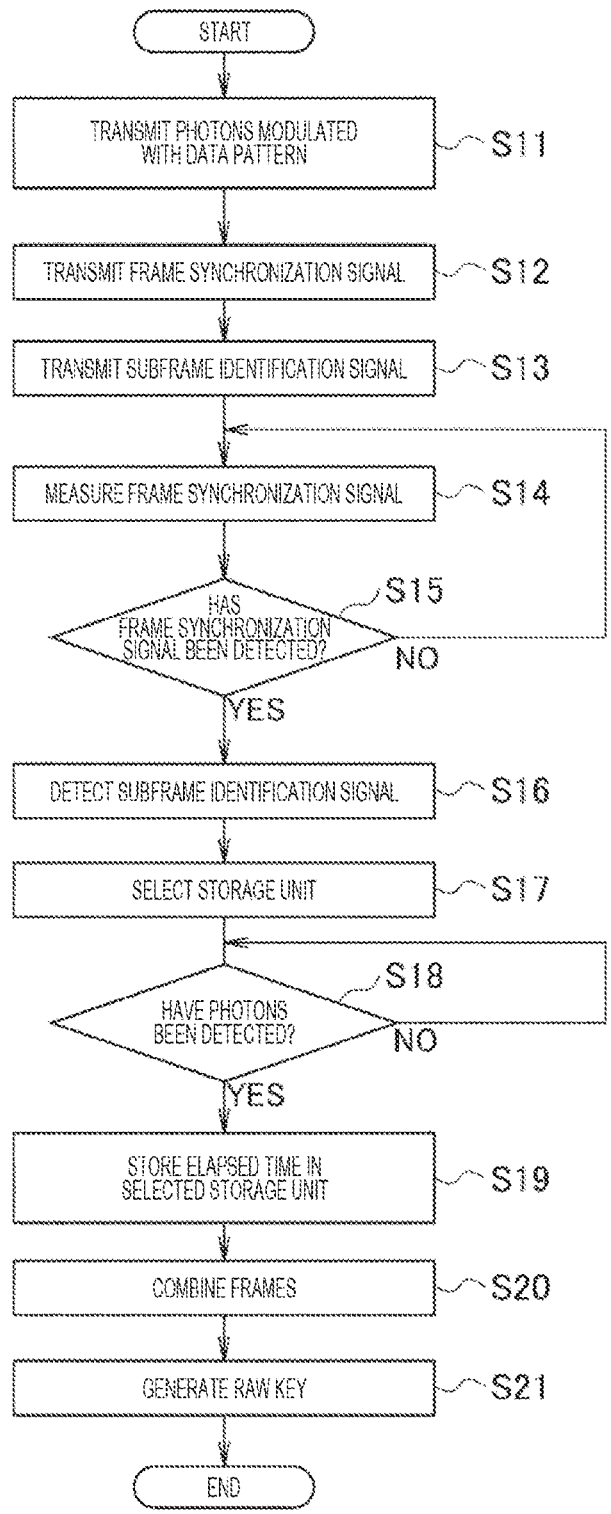
FIG. 4 is a flowchart illustrating a processing procedure of the quantum key distribution system according to the first embodiment.

Next, operations of the quantum key distribution system 100 according to the first embodiment will be described with reference to a flowchart illustrated in FIG. 4.

First, in step S11, the modulation unit 14 of the transmission device 1 modulates photons output from the light source unit 11 with a predetermined data pattern. The transmission unit 17 transmits the modulated photons to the reception device 2.

In step S12, the synchronization signal generation unit 12 generates a frame synchronization signal. Specifically, as illustrated in FIG. 2(a), the period from t0 to t14 is set to one frame, and frame synchronization signals d1 and d2 indicating the start of each frame are generated. The conversion unit 15 converts the frame synchronization signal into an optical signal. The transmission unit 17 transmits the optical signal to the reception device 2.

In step S13, the identification signal generation unit 13 generates a subframe identification signal synchronized with the frame synchronization signal. Specifically, as illustrated in FIG. 2(b), one frame is divided into a plurality of subframes F1 and F2 (two frames in this example), and subframe identification signals d11 and d12 indicating the start of the subframes F1 and F2 are generated.

The conversion unit 16 converts the subframe identification signal into an optical signal. The transmission unit 17 transmits the optical signal output from the conversion unit 16 to the reception device 2. The steps S11, S12, and S13 described above may be processed in parallel.

In step S14, the pulse determination unit 25 of the reception device 2 measures the rising pulse of the frame synchronization signal.

In step S15, the pulse determination unit 25 determines whether or not a frame synchronization signal has been detected, and in a case where the frame synchronization signal has been detected (S15; YES), the processing proceeds to step S16, otherwise (S15; NO), the processing returns to step S14.

In step S16, the storage device switching unit 28 detects the subframe identification signal. Specifically, the storage device switching unit 28 determines whether or not the subframe identification signals d11 and d12 illustrated in FIG. 2(b) have been detected.

In step S17, when the subframe identification signal is detected, the storage device switching unit 28 selects one of the first and second storage units 291 and 292 provided in the storage device 29. Specifically, the storage device switching unit 28 selects the first storage unit 291 when the subframe identification signal d11 indicating the start of the subframe F1 is detected as illustrated in FIG. 2(b). The storage device switching unit 28 selects the second storage unit 292 when the subframe identification signal d12 indicating the start of the subframe F2 is detected.

In step S18, the decoding unit 21 determines whether or not photons have been detected. In a case where photons have been detected (S18; YES), the processing proceeds to step S19.

In step S19, the time measurement unit 26 measures the elapsed time from the time when the subframe identification signal is detected to the time when the photon is detected. For example, the time measurement unit 26 measures an elapsed time T11 from a rise time t0 of the subframe identification signal d11 illustrated in FIG. 2(b) to a time t11 when the photon p1 illustrated in FIG. 2(c) is detected.

The time measurement unit 26 generates a ramp signal at the point of time when the subframe identification signal d11 is detected, and measures a voltage value of the ramp signal at the point of time when photons are detected. The time measurement unit 26 calculates an elapsed time from when the subframe identification signal is detected to when the photon is detected on the basis of the measured voltage value.

The time measurement unit 26 stores the calculated elapsed time in the storage unit selected by the storage device switching unit 28. Specifically, the storage device switching unit 28 selects the first storage unit 291 when the subframe identification signal d11 illustrated in FIG. 2(b) is detected. The time measurement unit 26 stores an elapsed time T11 (t0 to t11) until the photon is detected in the subframe F1 in the first storage unit 291.

The storage device switching unit 28 selects the second storage unit 292 when the subframe identification signal d12 is detected. The time measurement unit 26 stores an elapsed time T12 (t12 to t13) until the photon is detected in the subframe F2 in the second storage unit 292.

In step S20, the detection time calculation unit 27 combines the elapsed time T11 stored in the first storage unit 291 and the elapsed time T12 stored in the second storage unit 292, and calculates photon detection times from the frame synchronization signal until each of the photons p1 and p2 is detected.

In step S21, a raw key is generated by an arithmetic device (not illustrated) provided in the stage following the detection time calculation unit 27, on the basis of the time calculated by the detection time calculation unit 27 and the base information set in advance. The generated raw key becomes a secure key through a key distillation process (for example, shift processing, error correction, and confidential amplification processing). In this way, a secure key can be generated between the transmission device 1 and the reception device 2.

In this way, even in a case where the time from the frame synchronization signal to the photon detection is long, the time to the photon can be detected with high accuracy by the subframe identification signal.

In the timing chart illustrated in FIG. 2, an example in which one frame is divided into two subframes F1 and F2 has been described, but the number of subframes is not limited to two. The number of subframes may be determined by the transmission device 1 and notified to the reception device 2 before performing communication. In addition, the reception device 2 may automatically determine and set the number of subframes from the interval of subframe identification signals and the reception interval and accuracy of photons performed by histogram measurement of photon measurement. In addition, the storage device switching unit 28 may physically switch the storage device, may switch the address space on software, or may only change the header information. For example, a memory space for each subframe identification signal may be created and the time may be recorded therein, or the subframe identification signal and the photon detection time may be stored together.

As described above, the quantum key distribution system 100 according to the present embodiment is a quantum key distribution system that distributes a quantum key between the transmission device 1 and the reception device 2, and the transmission device 1 includes the modulation unit 14 that modulates photons output from the light source unit 11 with a predetermined data pattern, the synchronization signal generation unit 12 that generates a frame synchronization signal indicating a position of a frame of a random number data pattern, the identification signal generation unit 13 that divides the frame into a plurality of subframes and generate a subframe identification signal indicating a subframe, and the transmission unit 17 that transmits the photons modulated by the modulation unit 14, the frame synchronization signal, and the subframe identification signal. Furthermore, the reception device 2 includes the reception unit 30 that receives the photons, the frame synchronization signal, and the subframe identification signal transmitted from the transmission unit 17, the decoding unit 21 that decodes a data pattern from the photons received by the reception unit 30, the time measurement unit 26 that measures an elapsed time from the subframe identification signal until a photon is detected in each subframe, and the detection time calculation unit 27 that calculates a photon detection time from the frame synchronization signal to photon detection in one frame, based on the elapsed time.

Therefore, in the present embodiment, even in a case where the data pattern length is long, it is possible to reliably detect this data pattern and generate the quantum key. As a result, the number of transmittable samples can be increased, and a quantum key with reduced statistical uncertainty can be distributed.

That is, in a case where one frame is not divided into a plurality of subframes, as illustrated in FIG. 3, when a ramp signal is generated after the frame synchronization signal d1 is detected, the photon p1 within a certain time T1 can be detected, but the photon p2 after the time T1 has elapsed cannot be detected. The quantum key distribution system 100 according to the present embodiment can detect photons with high accuracy by dividing one frame into a plurality of subframes.

Note that each subframe identification signal may be a sequential number. In this case, since there is a likelihood that the communication is interrupted and the frame synchronization signal cannot be detected, information that can specify the frame synchronization information can be included in the subframe identification signal.

Furthermore, in the present embodiment, the storage device 29 that stores the elapsed time measured by the time measurement unit 26 is provided, and the detection time calculation unit 27 reads the elapsed time stored in the storage device 29 and calculates the photon detection time. Therefore, the photon detection time can be calculated with high accuracy using the elapsed time detected in each subframe.

Further, the transmission unit 17 transmits the frame synchronization signal and the subframe identification signal as an optical signal. Therefore, it is possible to avoid occurrence of a problem such as interference of the frame synchronization signal and the subframe identification signal with photon transmission.

Second Embodiment

Figure 5:
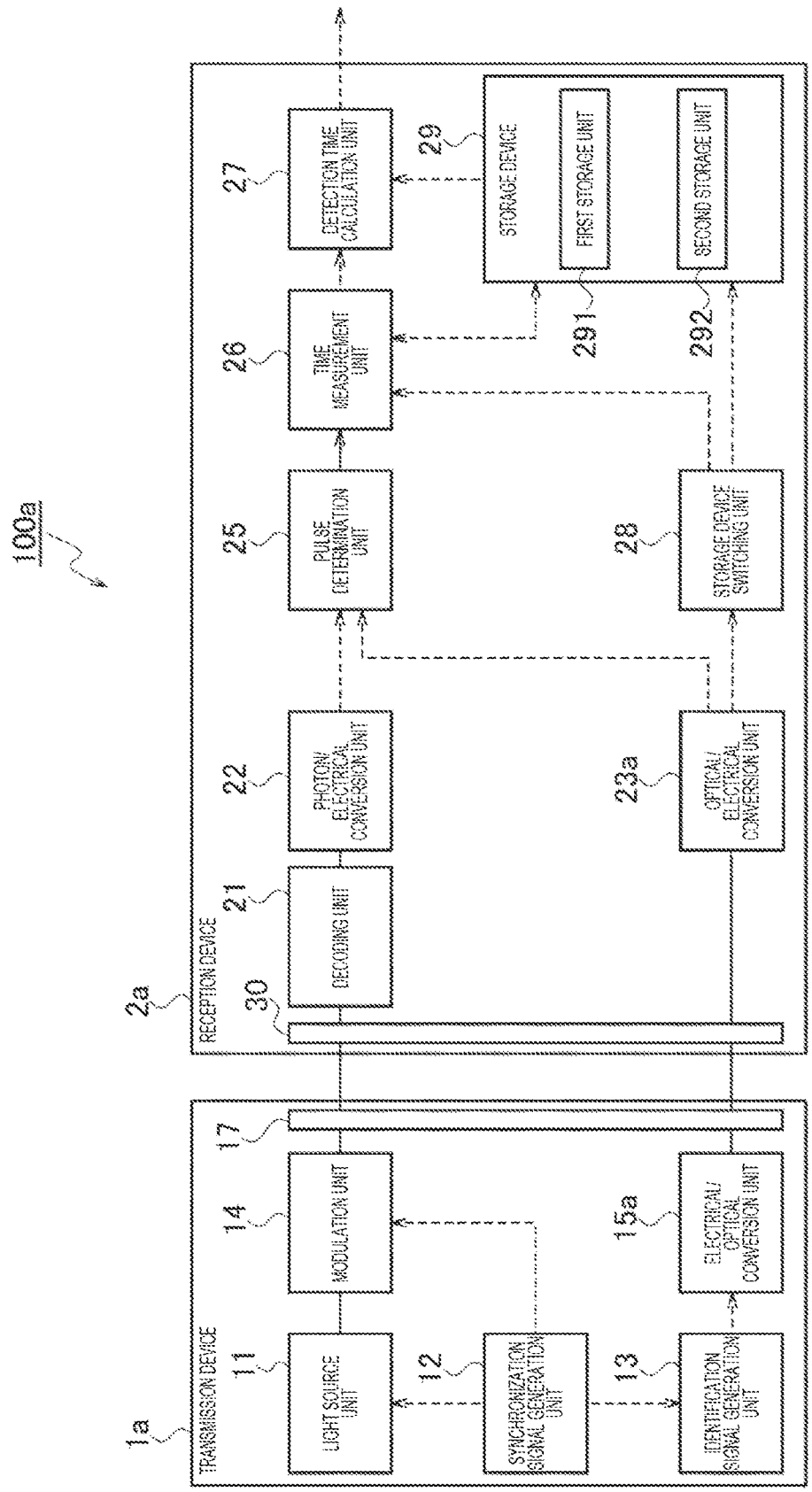
FIG. 5 is a block diagram illustrating a configuration of a quantum key distribution system according to a second embodiment.

Next, a second embodiment will be described. FIG. 5 is a block diagram illustrating a configuration of a quantum key distribution system 100a according to the second embodiment. The quantum key distribution system 100a illustrated in FIG. 5 is different from the quantum key distribution system 100 illustrated in FIG. 1 in that a transmission device 1a includes one electrical/optical conversion unit 15a (hereinafter abbreviated as a "conversion unit 15a") and a reception device 2a includes one optical/electrical conversion unit 23a (hereinafter abbreviated as a "conversion unit 23a"). The other configurations are similar to those of the quantum key distribution system 100 illustrated in FIG. 1.

In the second embodiment, several bits at the head of the frame synchronization signal generated by the synchronization signal generation unit 12 are transmitted as the subframe identification signal. The conversion unit 15a included in the transmission device 1a converts the subframe identification signal including the several bits at the head of the frame synchronization signal into an optical signal. That is, the transmission unit 17 includes a predetermined number of bits at the head of the frame synchronization signal in the subframe identification signal, and transmits the subframe identification signal.

The conversion unit 23a included in the reception device 2a branches the subframe identification signal transmitted from the transmission device 1a into two systems, and one branch is output to the pulse determination unit 25. The other branch is output to the storage device switching unit 28. The pulse determination unit 25 may have a function of cutting out only the pulse at the head of the subframe identification signal.

In this way, in the quantum key distribution system 100a according to the second embodiment, the several bits at the head of the frame synchronization signal can be included in the subframe identification signal and transmitted from the transmission device 1a to the reception device 2a, thereby simplifying the system configuration.

Third Embodiment

Figure 6:
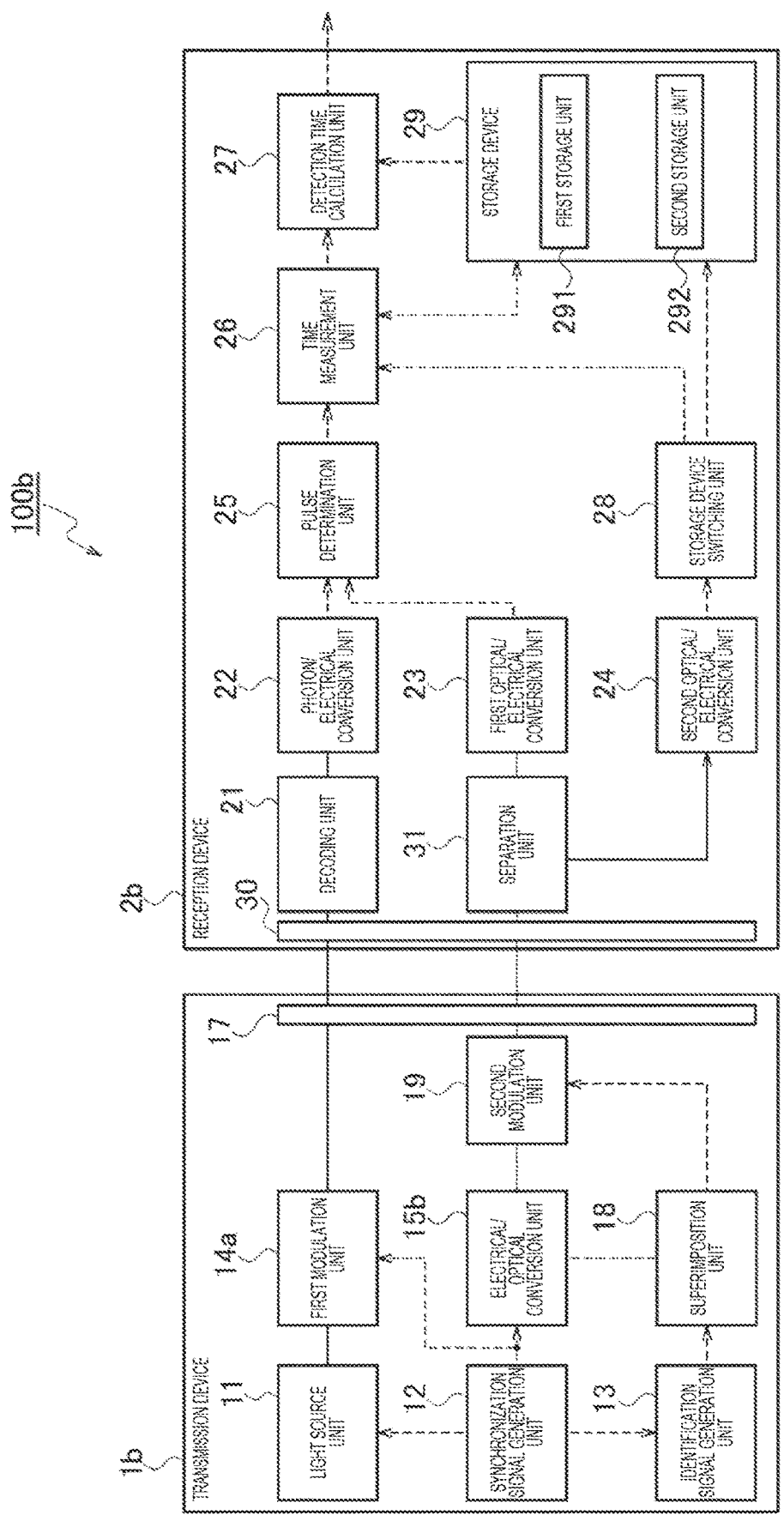
FIG. 6 is a block diagram illustrating a configuration of a quantum key distribution system according to a third embodiment.

Next, a third embodiment will be described. FIG. 6 is a block diagram illustrating a configuration of a quantum key distribution system 100b according to the third embodiment. The quantum key distribution system 100b illustrated in FIG. 6 is different from the quantum key distribution system 100 illustrated in FIG. 1 in that a transmission device 1b includes a superimposition unit 18 and a second modulation unit 19, and a reception device 2b includes a separation unit 31.

The superimposition unit 18 superimposes the subframe identification signal generated by the identification signal generation unit 13 on the frame synchronization signal. For example, the superimposition unit 18 modulates the frame synchronization signal at a low frequency and superimposes the modulated signal on the subframe identification signal. The superimposition unit 18 superimposes, for example, the frame synchronization signal on the subframe identification signal using phase modulation and polarization information.

An electrical/optical conversion unit 15b (hereinafter abbreviated as a "conversion unit 15b") converts the superimposed signal into an optical signal. The second modulation unit 19 modulates the optical signal output from the conversion unit 15b and outputs the modulated optical signal to the transmission unit 17. The modulated optical signal is transmitted from the transmission unit 17 to the reception device 2b.

The separation unit 31 separates the optical signal transmitted from the transmission device 1b into a frame synchronization signal and a subframe identification signal. The separation unit 31 outputs the frame synchronization signal to the conversion unit 23 and outputs the subframe identification signal to the conversion unit 24. The subsequent processing is similar to that of the first embodiment described above, and thus a detailed description thereof will be omitted.

In this way, in the quantum key distribution system 100b according to the third embodiment, the transmission unit 17 superimposes the subframe identification signal on the frame synchronization signal and transmits the superimposed signal. Therefore, the amount of data transmitted from the transmission device 1 to the reception device 2 can be reduced, thereby reducing the interference of transmission signals.

Figure 7:
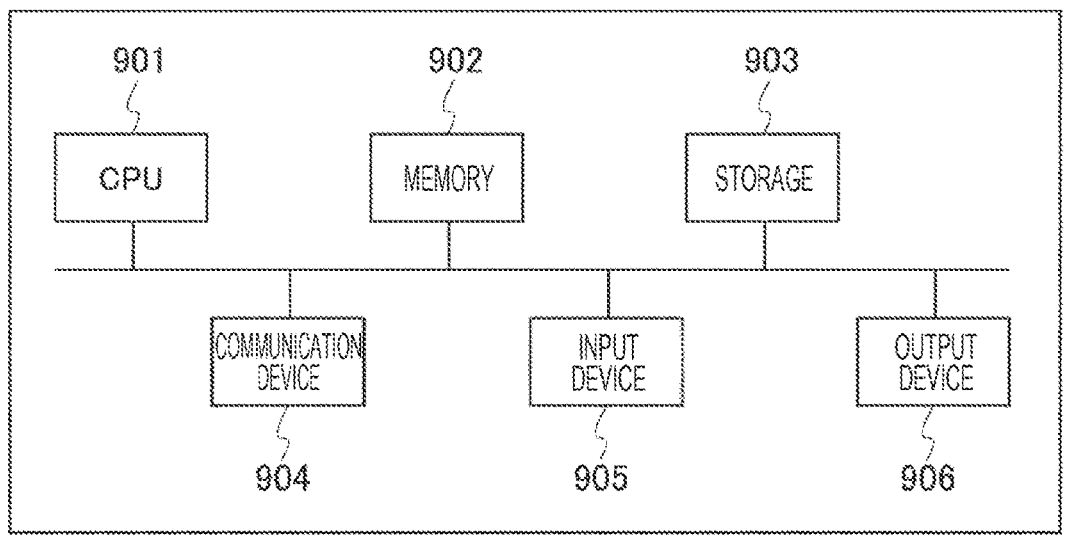
FIG. 7 is a block diagram illustrating a hardware configuration of the present embodiment.

As illustrated in FIG. 7, for example, a general-purpose computer system including a central processing unit (CPU, processor) 901, a memory 902, a storage 903 (hard disk drive: HDD, solid state drive: SSD), a communication device 904, an input device 905, and an output device 906 can be used as the quantum key distribution system 100 of the present embodiment described above. The memory 902 and the storage 903 are storage devices. In the computer system, each function of the quantum key distribution system 100 is implemented by the CPU 901 executing a predetermined program loaded on the memory 902.

The quantum key distribution system 100 may be implemented by one computer, or may be implemented by a plurality of computers. In addition, the quantum key distribution system 100 may be a virtual machine that is implemented in a computer.

A program for the quantum key distribution system 100 can be stored in a computer-readable recording medium such as an HDD, an SSD, a universal serial bus (USB) memory, a compact disc (CD), or a digital versatile disc (DVD), or can be distributed via a network.

Note that the present invention is not limited to the above embodiments, and various modifications can be made within the scope of the gist of the present invention.

REFERENCE SIGNS LIST 1, 1a, 1b Transmission device
2, 2a, 2b Reception device
11 Light source unit
12 Synchronization signal generation unit
13 Identification signal generation unit
14 Modulation unit
14a First modulation unit
15 First electrical/optical conversion unit
15a, 15b Electrical/optical conversion unit
16 Second electrical/optical conversion unit
17 Transmission unit
18 Superimposition unit
19 Second modulation unit
21 Decoding unit
22 Photon/electrical conversion unit
23 First optical/electrical conversion unit
23a Optical/electrical conversion unit
24 Second optical/electrical conversion unit
25 Pulse determination unit
26 Time measurement unit
27 Detection time calculation unit
28 Storage device switching unit
29 Storage device
30 Reception unit
31 Separation unit 100, 100a, 100b Quantum key distribution system
291 First storage unit
292 Second storage unit

The invention claimed is:

1. A quantum key distribution system comprising one or more computers for performing operations for distributing a quantum key between a transmission device and a reception device, the operations comprising:
   at the transmission device:
   modulating photons output from a light source unit with a predetermined data pattern;
   generating a frame synchronization signal indicating a position of a frame of a random number data pattern;
   dividing the frame into a plurality of subframes and generate a subframe identification signal indicating a subframe; and
   transmitting the modulated photons, the frame synchronization signal, and the subframe identification signal, and
   at the reception device:
   receiving the modulated photons, the frame synchronization signal, and the subframe identification signal transmitted by the transmission device;
   decoding a data pattern from the received modulated photons;
   measuring an elapsed time from the subframe identification signal until a photon is detected in each subframe; and
   calculating a photon detection time from the frame synchronization signal to photon detection in one frame, based on the elapsed time.

2. The quantum key distribution system according to claim 1, wherein the operations further comprise:
   at the reception device, after measuring the elapsed time from the subframe identification signal, storing the elapsed time in a storage device, and
   reading the elapsed time stored in the storage device before calculating the photon detection time.

3. The quantum key distribution system according to claim 1,
   wherein the frame synchronization signal and the subframe identification signal are transmitted as an optical signal having a wavelength different from a wavelength of the photon.

4. The quantum key distribution system according to claim 1,
   wherein the subframe identification signal includes a predetermined number of bits at a head of the frame synchronization signal.

5. The quantum key distribution system according to claim 1,
   wherein the subframe identification signal is superimposed on the frame synchronization signal.

6. A quantum key distribution method for distributing a quantum key between a transmission device and a reception device, the method comprising:
   at the transmission device, a step of modulating photons output from a light source unit with a predetermined data pattern;
   a step of generating a frame synchronization signal indicating a position of a frame of a random number data pattern;
   a step of dividing the frame into a plurality of subframes and generating a subframe identification signal indicating a subframe; and
   a step of transmitting the modulated photons, the frame synchronization signal, and the subframe identification signal; and
   at the reception device, a step of receiving the modulated photons, the frame synchronization signal, and the subframe identification signal transmitted from the transmission device;
   a step of decoding a data pattern from the received modulated photons;
   a step of measuring an elapsed time from the subframe identification signal until a photon is detected in each subframe; and
   a step of calculating a photon detection time from the frame synchronization signal to photon detection in one frame, based on the elapsed time.

7. A non-transitory computer-readable storage medium storing a quantum key distribution program for causing a computer to perform operations for distributing a quantum key between a transmission device and a reception device, the operations comprising:
   at the transmission device, a step of modulating photons output from a light source unit with a predetermined data pattern;
   a step of generating a frame synchronization signal indicating a position of a frame of a random number data pattern;
   a step of dividing the frame into a plurality of subframes and generating a subframe identification signal indicating a subframe; and
   a step of transmitting the modulated photons, the frame synchronization signal, and the subframe identification signal; and
   at the reception device, a step of receiving the modulated photons, the frame synchronization signal, and the subframe identification signal transmitted from the transmission device;
   a step of decoding a data pattern from the received modulated photons;
   a step of measuring an elapsed time from the subframe identification signal until a photon is detected in each subframe; and
   a step of calculating a photon detection time from the frame synchronization signal to photon detection in one frame, based on the elapsed time.

* * * * *